(12) United States Patent
Deng et al.

(10) Patent No.: US 11,569,719 B2
(45) Date of Patent: Jan. 31, 2023

(54) DIRECT DRIVE ELECTRIC MOTOR HAVING STATOR AND MAGNET CONFIGURATIONS FOR IMPROVED TORQUE CAPABILITY

(71) Applicant: WHIRLPOOL CORPORATION, Benton Harbor, MI (US)

(72) Inventors: Fang Deng, Novi, MI (US); Cheng Gong, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 17/562,057

(22) Filed: Dec. 27, 2021

(65) Prior Publication Data

US 2022/0123633 A1   Apr. 21, 2022

Related U.S. Application Data

(63) Continuation of application No. 16/704,622, filed on Dec. 5, 2019, now Pat. No. 11,245,317.

(51) Int. Cl.
| | |
|---|---|
| *H02K 16/02* | (2006.01) |
| *H02K 21/26* | (2006.01) |
| *H02K 21/00* | (2006.01) |
| *D06F 21/02* | (2006.01) |
| *D06F 37/30* | (2020.01) |

(52) U.S. Cl.
CPC ............ *H02K 16/02* (2013.01); *D06F 21/02* (2013.01); *D06F 37/304* (2013.01)

(58) Field of Classification Search
CPC .......... H02K 21/26; H02K 21/00; H02K 1/17; H02K 41/00

USPC .............. 310/154.01, 154.02, 156.43, 181
See application file for complete search history.

(56) References Cited

U.S. PATENT DOCUMENTS

| | | | |
|---|---|---|---|
| 4,712,028 A | 12/1987 | Horber | |
| 4,757,220 A | 7/1988 | Pouillange | |
| 6,262,508 B1 * | 7/2001 | Shibayama | H02K 21/00 310/152 |
| 6,777,842 B2 * | 8/2004 | Horst | H02K 21/44 310/154.22 |
| 7,196,446 B2 | 3/2007 | Hans | |

(Continued)

FOREIGN PATENT DOCUMENTS

| | | |
|---|---|---|
| CN | 103066719 | 4/2013 |
| CN | 103490534 | 1/2014 |

(Continued)

*Primary Examiner* — Jose A Gonzalez Quinones
(74) *Attorney, Agent, or Firm* — Price Heneveld LLP (57) ABSTRACT

An electric motor for an appliance includes a rotor coupled with a drive shaft. The rotor includes a plurality of rotor magnets that each define a magnet assembly including a plurality of magnet portions having different magnet pole orientations. A stator is in electromagnetic communication with the rotor. A gap is defined between the stator and the rotor. The stator comprises a stator core. A plurality of stator poles define the gap. Stator magnets are positioned within the stator core and are located to partially define the gap. Each stator magnet defines a pair of flux paths that extend around an outer perimeter of the stator magnet and onto the gap. The different magnet pole orientations of the plurality of rotor magnets operate to direct an effective magnetic flux toward the gap.

20 Claims, 10 Drawing Sheets

(56) References Cited

U.S. PATENT DOCUMENTS

| | | |
|---|---|---|
| 7,626,299 B2 | 12/2009 | Koshikawa et al. |
| 8,754,568 B2 | 6/2014 | Kim et al. |
| 8,847,464 B2 | 9/2014 | Qu et al. |
| 9,644,305 B2 | 5/2017 | Kim |
| 2007/0090713 A1* | 4/2007 | Arita .................... H02K 21/042 310/191 |
| 2010/0181858 A1 | 7/2010 | Hibbs et al. |
| 2010/0244446 A1 | 9/2010 | Qu et al. |
| 2011/0198950 A1 | 8/2011 | Zhao |
| 2011/0260672 A1 | 10/2011 | Ramu |
| 2012/0153763 A1 | 6/2012 | Kenji |
| 2013/0057091 A1 | 3/2013 | Kim et al. |
| 2014/0252901 A1 | 9/2014 | Sugita et al. |
| 2017/0117784 A1 | 4/2017 | Guo et al. |
| 2017/0356118 A1 | 12/2017 | Fukui |
| 2019/0190413 A1 | 6/2019 | Ueno et al. |
| 2019/0273405 A1 | 9/2019 | Ho |

FOREIGN PATENT DOCUMENTS

| | | |
|---|---|---|
| CN | 109842220 | 6/2019 |
| KR | 20130000279 | 1/2013 |
| WO | 2007123057 | 11/2007 |
| WO | 2019151783 | 8/2019 |

\* cited by examiner

DIRECT DRIVE ELECTRIC MOTOR HAVING STATOR AND MAGNET CONFIGURATIONS FOR IMPROVED TORQUE CAPABILITY

CROSS-REFERENCE TO RELATED APPLICATION

The present application is a continuation of U.S. patent application Ser. No. 16/704,622 filed Dec. 5, 2019, entitled DIRECT DRIVE ELECTRIC MOTOR HAVING STATOR AND MAGNET CONFIGURATIONS FOR IMPROVED TORQUE CAPABILITY, now U.S. Pat. No. 11,245,317, the entire disclosure of which is hereby incorporated herein by reference.

BACKGROUND OF THE DISCLOSURE

The present disclosure generally relates to electric direct drive motors, and more specifically, an electric direct drive motor having stator magnets and rotor magnets that are positioned and configured for improving electromagnetic communication therebetween, as well as an improved effective torque for the direct-drive motor.

SUMMARY OF THE DISCLOSURE

According to one aspect of the present disclosure, an electric motor for an appliance includes an inner rotor coupled with a first drive shaft. An outer rotor is coupled with a second drive shaft. A stator is in electromagnetic communication with the inner and outer rotors. An inner gap is defined between the stator and the inner rotor and an outer gap is defined between the stator and the outer rotor. The stator comprises a stator core. A plurality of inner stator poles define the inner gap. A plurality of outer stator poles define the outer gap. Stator magnets are positioned within the stator core and are located to partially define at least one of the inner and outer gaps. Each stator magnet defines a pair of flux paths that extend around an outer perimeter of the stator magnet and onto a respective gap of the inner and outer gaps.

According to another aspect of the present disclosure, an electric motor for an appliance includes a rotor coupled with a drive shaft. The rotor includes a plurality of rotor magnets that each define a magnet assembly including a plurality of magnet portions having different magnet pole orientations. A stator is in electromagnetic communication with the rotor. A gap is defined between the stator and the rotor. The stator comprises a stator core. A plurality of stator poles define the gap. Stator magnets are positioned within the stator core and are located to partially define the gap. Each stator magnet defines a pair of flux paths that extend around an outer perimeter of the stator magnet and into the gap. The different magnet pole orientations of the plurality of rotor magnets operate to direct an effective magnetic flux toward the gap.

According to yet another aspect of the present disclosure, an electric motor for an appliance includes a rotor coupled with a drive shaft. The rotor includes magnet assemblies. Each magnet assembly includes a plurality of magnet portions having different magnet pole orientations. A stator is positioned in electromagnetic communication with the rotor. A gap is defined between the stator and the rotor. The stator includes a stator core. A plurality of stator poles extend inward toward the rotor to define the gap. Stator magnets are positioned within the stator core to at least partially define the gap. The plurality of magnet portions of each magnet assembly defines a Halbach configuration that directs an electromagnetic field toward the gap and directs an effective magnetic north pole of the magnet assembly toward the gap to increase an electromagnetic communication between the rotor and the stator.

These and other features, advantages, and objects of the present disclosure will be further understood and appreciated by those skilled in the art by reference to the following specification, claims, and appended drawings.

The components in the figures are not necessarily to scale, emphasis instead being placed upon illustrating the principles described herein.

DETAILED DESCRIPTION

The present illustrated embodiments reside primarily in combinations of method steps and apparatus components related to a direct drive motor having a configuration of stator magnets and rotor magnet assemblies that increase the electromagnetic communication between the rotor and the stator, resulting in an increased torque capability for the direct drive motor. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Figure 1:
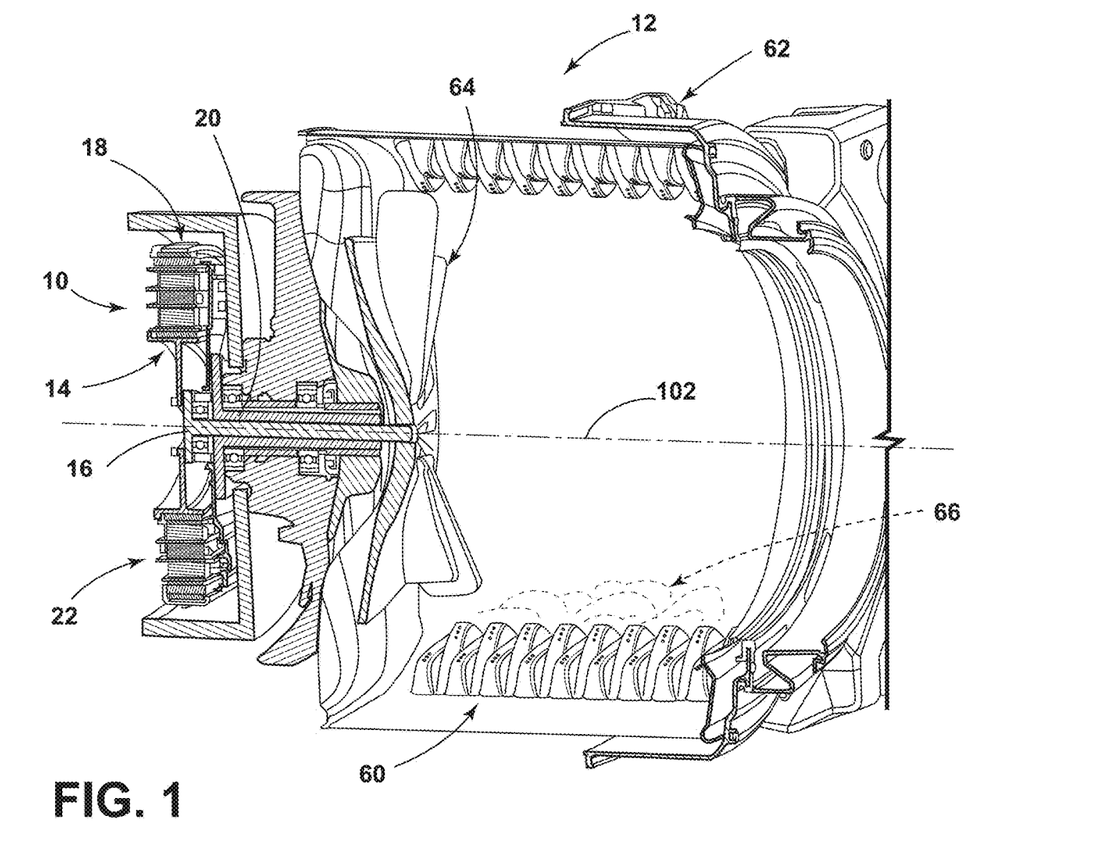
FIG. 1 is a cross-sectional view of an exemplary laundry appliance that includes an aspect of the direct drive motor within a dual-drive configuration.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-10, reference numeral 10 generally refers to a direct drive motor that is incorporated within various appliances and fixtures. While it is contemplated that this direct drive motor 10 may be included within a wide range of applications, certain illustrations provided herein are indicative of the direct drive motor 10 placed within a laundry appliance 12. According to various aspects of the device, the electric direct drive motor 10 for the appliance 12 includes an inner rotor 14 that is coupled with a first drive shaft 16, an outer rotor 18 that is coupled with a second drive shaft 20, and a stator 22 in electromagnetic communication with the inner and outer rotors 14, 18, an inner gap 24 that is defined between the stator 22 and an inner rotor 14 and an outer gap 26 that is defined between the stator 22 and the outer rotor 18. The stator 22 includes a stator core 28 and a plurality of inner stator poles 32 that define the inner gap 24 with the inner rotor 14. The stator poles 30 can also include a plurality of outer stator poles 34 that are included within the stator core 28 that define the outer gap 26 with the outer rotor 18. Stator magnets 36 are positioned within the stator core 28 and are located to partially define at least one of the inner and outer gaps 24, 26. Each stator magnet 36 defines a pair of flux paths 38 that extend through the stator core 28 and around an outer perimeter 40 of the stator magnet 36 and into a respective gap of the inner and outer gaps 24, 26. It is contemplated that the stator magnets 36 may be positioned within the inner stator poles 32, the outer stator poles 34, or both the inner and outer stator poles 32, 34 for achieving the desired electromagnetic communication and torque output for the various aspects of the direct drive motor 10.

It is contemplated that each stator pole 30 for the inner and outer stator poles 32, 34 includes a stator tooth 50 that is incorporated within the stator core 28 and a plurality of windings 52 that are wound around each stator tooth 50. The combination of the windings 52 and the teeth 50 for the stator core 28, in addition to the stator magnets 36, forms the various stator poles 30 for the direct drive motor 10. The inner stator poles 32 utilize inner stator teeth 50 of the stator core 28 and the outer stator poles 34 utilize outer stator teeth 50 of the stator core 28.

Figure 2:
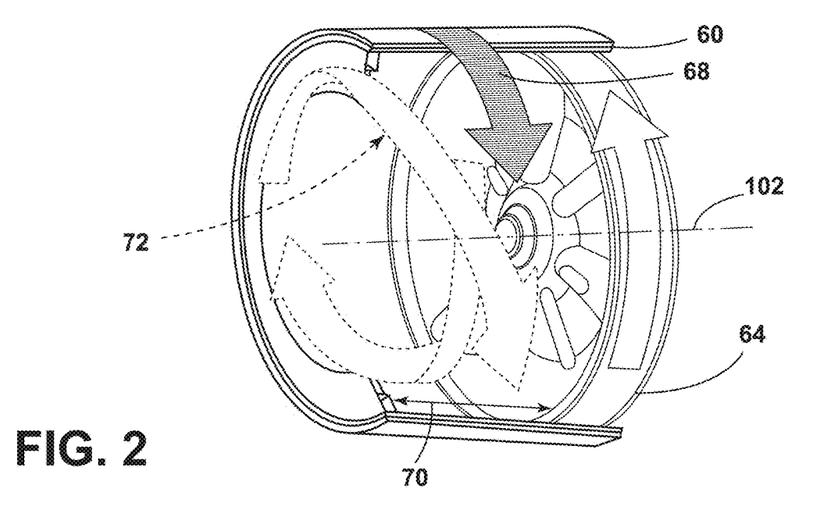
FIG. 2 is a schematic cross-sectional view of an aspect of a laundry appliance that includes a dual-drive motor for operating a rotating drum and an impeller.

As exemplified in FIGS. 1 and 2, the direct drive motor 10 can include an outer rotor 18 that is coupled with a rotationally operable drum 60 via the second drive shaft 20 that rotates within a tub 62 for the laundry appliance 12. The inner rotor 14 and the first drive shaft 16 for the direct drive motor 10 can be coupled with an impeller 64, sometimes referred to as a spider, that rotates within the drum 60. The rotating drum 60 and the impeller 64 are configured to rotate independently of one another through separate and independent operation of the inner and outer rotors 14, 18 for the direct drive motor 10. It is contemplated that the inner and outer rotors 14, 18 may be alternatively coupled such that the inner rotor 14 is configured to rotate the rotating drum 60 and the outer rotor 18 is configured to rotate the impeller 64. Through the use of the independent operating impeller 64 and rotating drum 60, various agitating patterns are able to be accomplished for processing articles of laundry 66 within the rotating drum 60. These agitating patterns are configured to move the laundry 66 within a rotational path 68 of the drum 60 as well as a lateral path 70 between front and rear portions of the rotating drum 60 to form a helical-type pattern 72. These agitating patterns are configured to manipulate articles of laundry 66, as well as fluid and laundry chemistries contained within the drum 60.

As exemplified in FIGS. 1-10, each of the inner and outer rotor 14, 18 includes a plurality of rotor magnets 80 that are in electromagnetic communication with the inner and outer stator poles 32, 34, respectively. It is contemplated that the rotor magnets 80 for one or both of the inner and outer rotors 14, 18 can include magnet assemblies 82 that include a plurality of magnet portions 84. These magnet portions 84 cooperate to define each rotor magnet 80 for directing an effective magnetic north pole 86 and the magnetic flux 100 in the direction of the respective gap of the inner and outer gaps 24, 26 for the direct drive motor 10. Stated another way, the rotor magnets 80 of the outer rotor 18 are designed to direct the effective magnetic north pole 86 inward and toward the outer stator poles 34. The magnet portions 84 of the rotor magnets 80 for the inner rotor 14 are configured to direct the effective magnetic north pole 86 in an outward direction and toward the inner stator poles 32 for the direct drive motor 10.

Referring now to FIGS. 3-8, the various magnet portions 84 of each rotor magnet 80 are oriented in different magnet-pole orientations. These magnet-pole orientations are positioned to direct magnetic flux 100 and the effective magnetic north pole 86 toward the gap defined between the respective rotor and stator combination. In the case of the inner rotor 14, the magnetic flux 100 is directed away from a rotational axis 102 of the direct drive motor 10. In the case of the outer rotor 18, the magnetic flux 100 is directed toward the rotational axis 102 of the direct drive motor 10.

Referring again to FIGS. 3-8, the positioning of the magnet portions 84 of the various rotor magnets 80 is sometimes referred as a Halbach configuration 110. This Halbach configuration 110 of magnet portions 84, as discussed above, serves to direct the magnetic flux 100 or the effective magnetic north pole 86, toward the opposing stator 112 and through the corresponding gap 132 for the direct drive motor 10. The use of this Halbach configuration 110 of the magnet portions 84 manipulates the electromagnetic field 114 of the rotor magnet 80 to be more concentrated or intensified within the corresponding gap 132 between the subject rotor 116 and the opposing stator 112. This configuration also increases the density of the magnetic flux 100 within the corresponding gap 132 to, in turn, increase the electromotive force 118 generated between the subject rotor 116 and the opposing stator 112 during operation of the direct drive motor 10.

Referring again to FIGS. 3-8, in an exemplary aspect of the device, the magnet portions 84 of each rotor magnet 80 can include three separate magnets including two flanking magnets that each direct a respective magnetic north pole 142 toward a center magnet that directs a respective magnetic north pole 142 towards the corresponding gap 132. The resulting effective magnetic north pole 86 includes a magnified or intensified magnetic flux 100 that is directed toward the corresponding gap and toward the stator poles 30 that are in the electromagnetic communication with the subject rotor 116. The rotor magnets 80 cooperate with the rotor body to produce magnet pole pairs 180 within the subject rotor 116 using only one rotor magnet 80. The adjacent portion of the rotor body 170 is magnetically energized to define the other half of each rotor pole pair 180. This configuration of the rotor magnets 80 helps to produce a magnetic gearing effect that produces more torque using the same general levels of electrical current, as will be described more fully below.

Referring again to FIGS. 3-10, each stator tooth 50 for the inner and outer stator poles 32, 34 for the stator core 28 includes a magnet recess 130. This magnet recess 130 is configured to receive a corresponding stator magnet 36 at the corresponding gap 132 defined between the subject rotor 116 and the opposing stator 112. Accordingly, each magnet recess 130 is positioned at a gap-facing surface 134 of the stator core 28. When placed within the magnet recesses 130, each stator magnet 36 typically includes a curved surface 136 that defines the shape of the corresponding gap 132 of the inner and outer gaps 24, 26. This curved surface 136, when the stator magnet 36 is placed in an inner-rotor configuration 138, has a generally concave curve that matches the shape of the inner gap 24. In an outer-rotor configuration 140, the rotor magnet 80 can have a generally convex surface that, similarly, matches the shape of the outer gap 26 for the direct drive motor 10. Typically, these stator magnets 36 are positioned to direct a magnetic north pole 142 away from the curved surface 136 and away from the corresponding gap 132. In this manner, the magnetic south pole 144 of the stator magnet 36 will be positioned in the direction of the effective magnetic north pole 86 of the rotor magnets 80 having the Halbach configuration 110. Through this positioning of the stator magnets 36 and rotor magnets 80, and the magnetic poles for each, the stator magnets 36 and rotor magnets 80 are generally attracted to one another within the corresponding gap 132.

Referring again to FIGS. 3-8, the positioning of the stator magnets 36 within each of the stator teeth 50 has the effect of magnetically separating each stator tooth 50 to define separate effective stator poles 88 within each stator pole 30. Using FIG. 3 as an exemplary aspect of the device, the stator core 28 includes (12) stator teeth 50 each having a single magnet recess 130. However, because of the positioning of the stator magnets 36 and the windings 52, these (12) stator teeth 50, each having a single stator magnet 36, are effectively configured to define (24) a pair of separate effective stator poles 88 that are in electromagnetic communication with the various rotor magnets 80 of the inner rotor 14. Similarly, in the exemplary aspect of FIG. 4, the (12) stator teeth 50 of the outer-rotor configuration 140 each include a pair of stator magnets 36 disposed within a pair of corresponding magnet recesses 130. Using these two stator magnets 36, each stator core 28 is effectively separated into three individual effective stator poles 88. Accordingly, the configuration of the stator included within FIG. 4 reflects a configuration having (36) effective stator poles 88, while only including (12) stator teeth 50. These effective stator poles 88 that are defined by each stator tooth 50 and the stator magnets 36 are generated through the ability of the stator magnet 36 to guide magnetic flux 100 around the outer perimeter 40 of each stator magnet 36, and at the same time reducing leakage flux that may occur in the direct drive motor 10.

Referring again to FIGS. 3-8, each of the stator magnets 36, and the stator teeth 50, are shaped to optimize the flow of magnetic flux 100 between the subject rotor 116 and the opposing stator 112 for the direct drive motor 10. To accomplish this shaping of the various flux paths 38 within the direct drive motor 10, each stator magnet 36 includes one or more chamfered portions 160 that define the pair of flux paths 38 extending around the outer perimeter 40 of the stator magnet 36. These chamfered portions 160 define a consistent shape or generally consistent shape of the stator core 28 around the stator magnet 36. This generally consistent shape of the stator core 28 serves to decrease the density of the magnetic flux 100 around the stator magnet 36 and through the effective stator poles 88. This effect produces a more consistent flux path 38 for the magnetic flux 100 between the subject rotor 116 and the opposing stator 112 for the direct drive motor 10, in each of the inner-rotor and outer-rotor configurations 138, 140.

Figure 3:
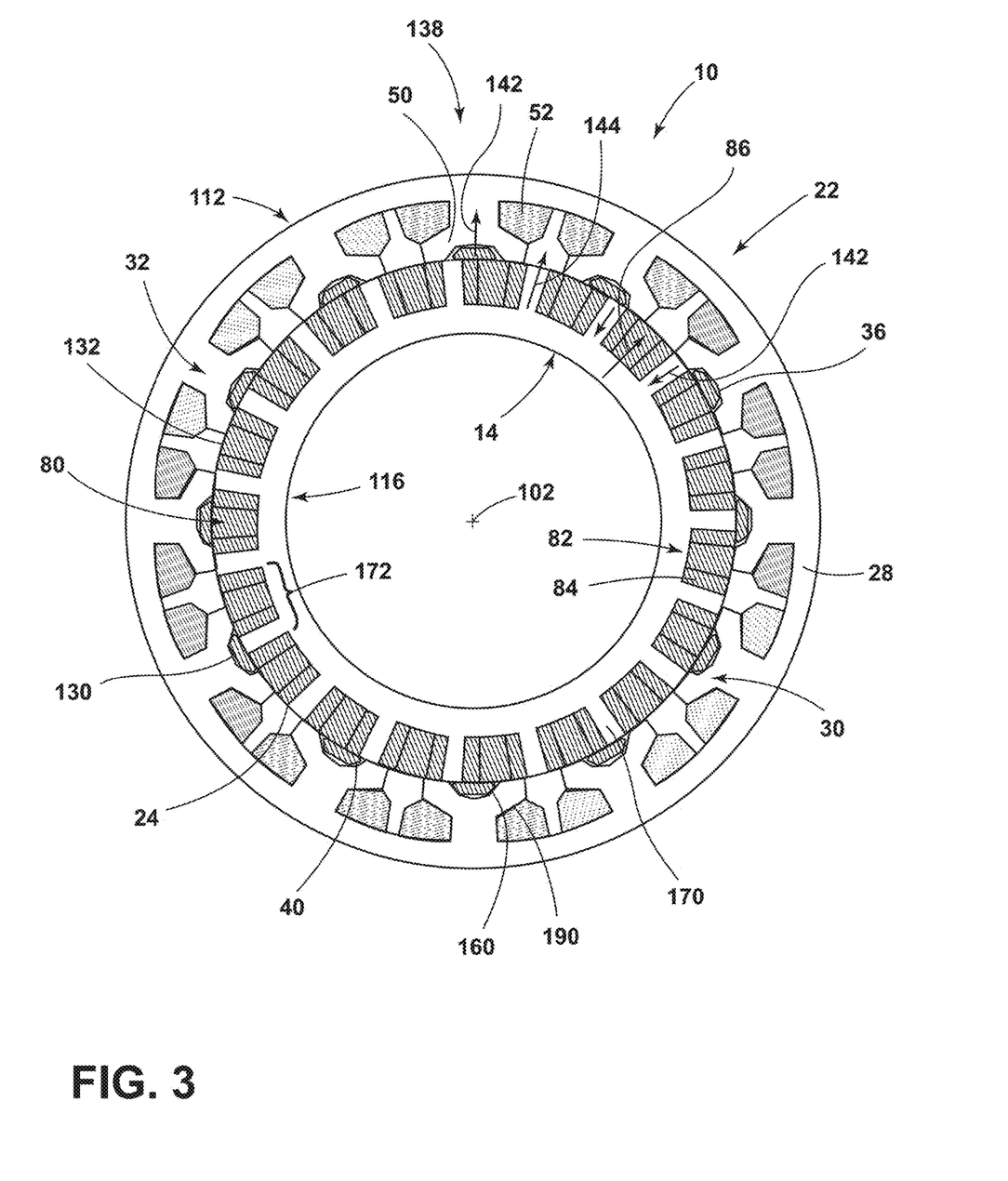
FIG. 3 is a cross-sectional view of a dual direct drive motor having an inner-rotor configuration and incorporating an aspect of the stator and rotor magnets disclosed herein.
Figure 4:
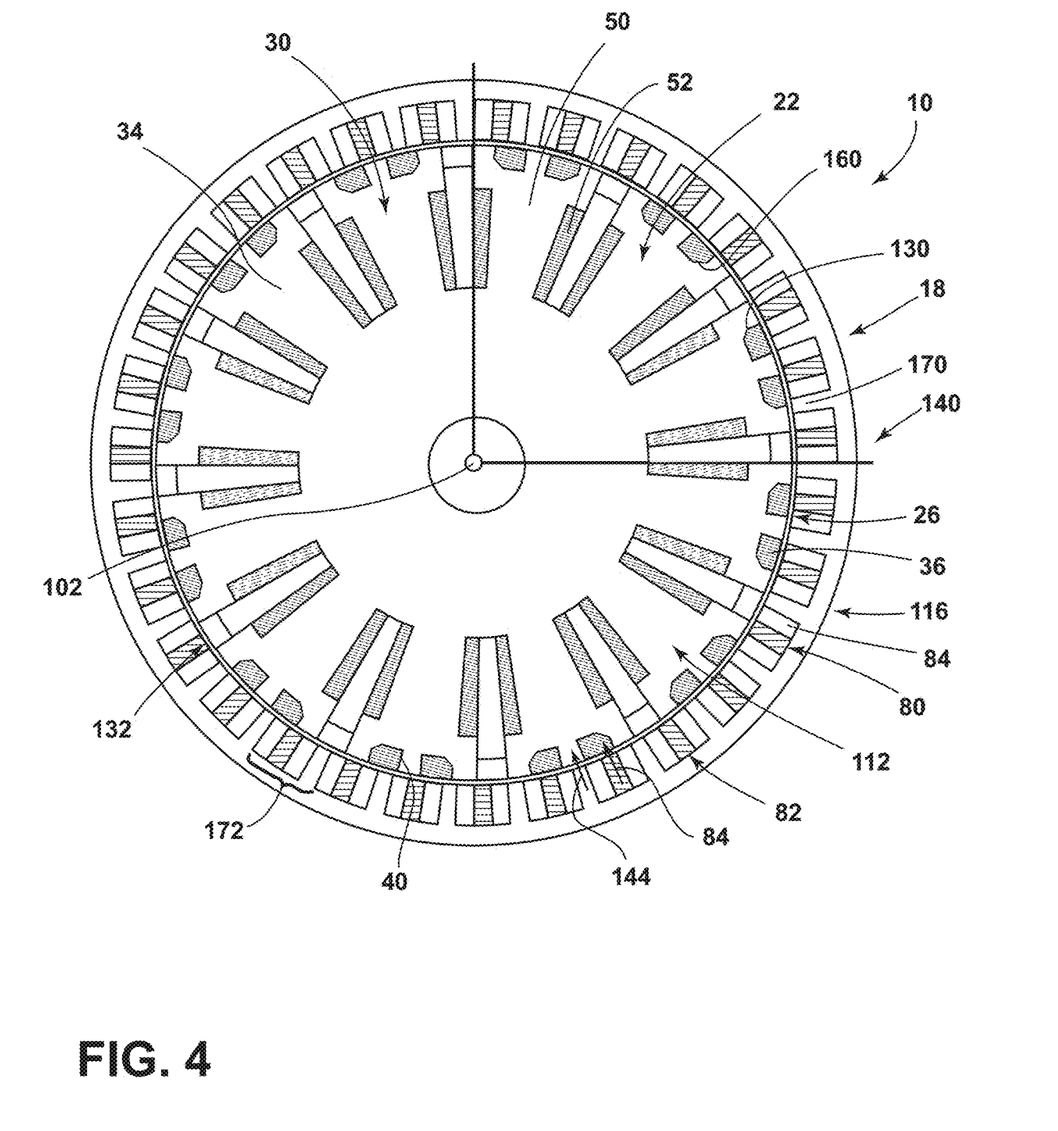
FIG. 4 is a cross-sectional view of a direct drive motor having an outer-rotor configuration and incorporating an aspect of the stator magnets and rotor magnet configurations.
Figure 5:
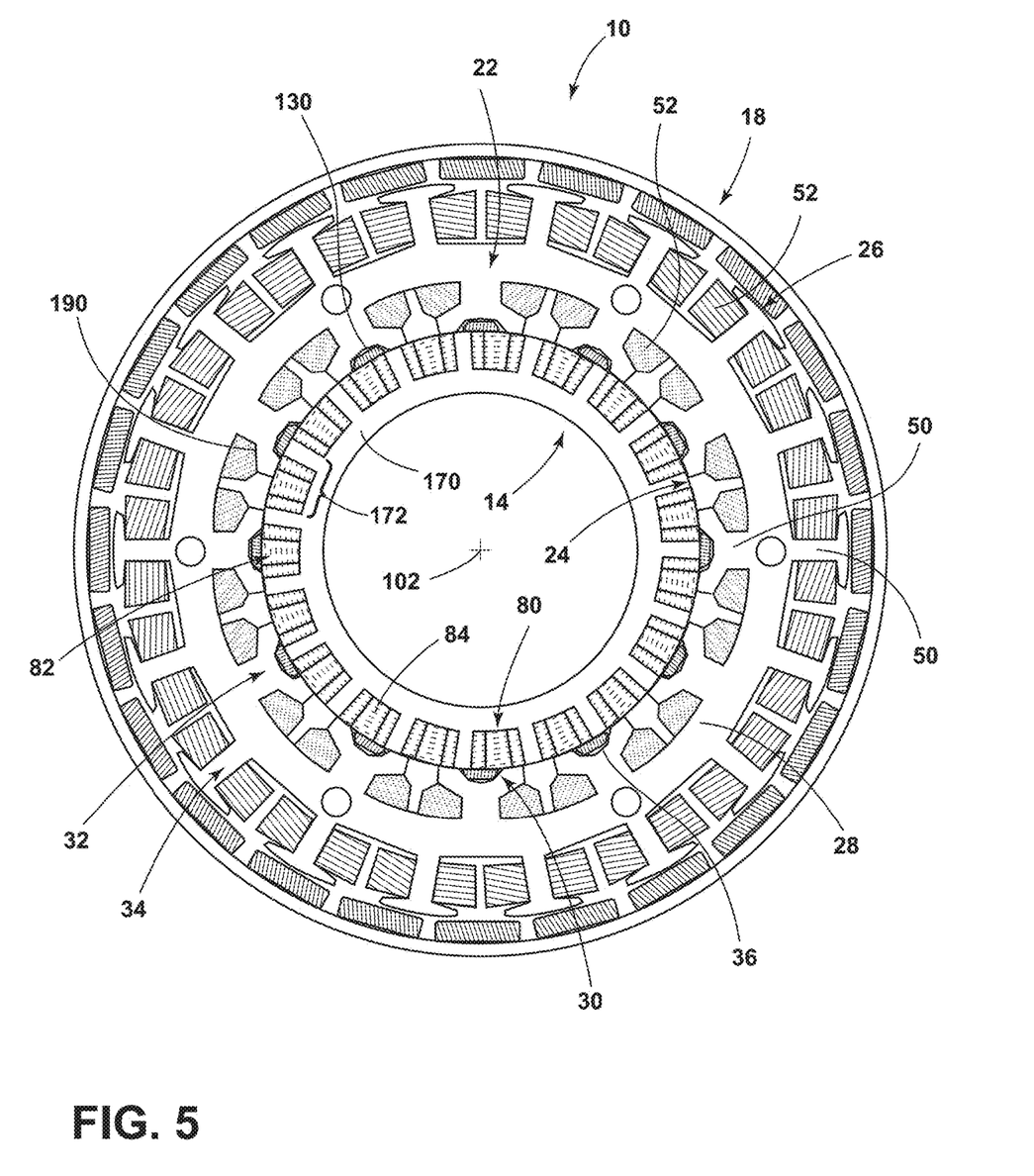
FIG. 5 is a cross-sectional view of a dual direct drive motor that incorporates stator and rotor magnets according to an aspect of the device.

As exemplified in FIGS. 3 and 4, the number of stator magnets 36 contained within the opposing stator 112 can vary. In FIG. 3, the inner-rotor configuration 138 includes a single stator magnet 36 that fits within the corresponding stator teeth 50 of the inner stator poles 32 and the stator magnet 36 includes a pair of chamfered portions 160. In the outer-rotor configuration 140, the stator teeth 50 for the outer stator poles 34 are wider and can include a plurality of stator magnets 36. In the outer-rotor configuration 140, each stator magnet 36 typically includes only one chamfered portion 160 that is positioned near the outer edge of the stator tooth 50. The area between the stator magnets 36 may include, or be free of, chamfered portions 160. Accordingly, in the exemplary device reflected in FIG. 4, two stator magnets 36 are included within each stator tooth 50 to produce three separate flux paths 38 that result in the generation of three separate effective stator poles 88 that can electromagnetically communicate with the outer rotor 18 for the direct drive motor 10.

Referring now to FIGS. 3-7, the use of the rotor magnets 80 having the Halbach configuration 110 serves to reduce the overall number of rotor magnets 80 that are included within each of the inner and outer rotors 14, 18. A conventional rotor will include rotor magnet pairs that include magnetic members that are positioned in alternating polarities around a circumferential surface of the inner or outer rotor 14, 18. As discussed previously, the rotor magnets 80 in the instant device are configured to each provide an effective magnetic north pole 86 that is directed toward the corresponding gap 132. Using this configuration, the portions of the rotor body 170 adjacent to and between each of the rotor magnets 80 are magnetically energized to produce an opposing magnetic north pole 142 that is positioned in opposition to that of the rotor magnets 80 having the Halbach configuration 110. Accordingly, in the device disclosed herein, the rotor magnet pairs 172 for the subject rotor 116 are produced through a series of rotor magnets 80 that have a common polarity (i.e., in the direction of the corresponding gap 132) that produces the other half (magnetic south pole 144) of the rotor magnet pair 172 using the material of the rotor body 170 spaced between the rotor magnets 80. This configuration allows for the subject rotor 116 to be made in a more compact design, such that fewer rotor magnets 80 need to be included within a particular subject rotor 116. The combination of the effective rotor magnet pairs 172 and the effective stator poles 88 also assists in producing the magnetic gearing effect, as will be discussed below.

As exemplified in FIGS. 3-10, the configuration of the direct drive motor 10 is generally in the form of a Vernier motor that is capable of producing a higher torque at lower speeds. According to various aspects of the device, the electric direct drive motor 10 includes the subject rotor 116 that is coupled with a drive shaft, where the subject rotor 116 includes the plurality of rotor magnets 80 that each define a magnet assembly 82 including a plurality of magnet portions 84 having different magnet pole orientations. The opposing stator 112 is in electromagnetic communication with the subject rotor 116. A corresponding gap 132 is defined between the subject rotor 116 and the opposing stator 112 where the opposing stator 112 includes the stator core 28. The opposing stator 112 also includes a plurality of stator poles 30 that define the gap 132. The stator magnets 36 are positioned within the stator core 28 and are located to partially define the corresponding gap 132. Each stator magnet 36 defines a pair of flux paths 38 and effective stator poles 88 that extend around an outer perimeter 40 of the stator magnet 36 and into the corresponding gap 132.

Referring again to FIGS. 3-10, the different magnet pole orientations of the magnet portions 84 for the plurality of rotor magnets 80 operate to direct a magnetic flux 100 toward the corresponding gap 132. As discussed above, the rotor magnets 80 are each oriented to have the effective magnetic north pole 86 and magnetic flux 100 that is directed toward the same central point, in the case of an outer-rotor configuration 140. In the inner-rotor configuration 138, the effective magnetic north poles 86 and the magnetic flux 100 are directed away from the same central point. These rotor magnets 80 cooperate with the material of the rotor body 170 to produce effective rotor magnet pairs 172 that interact with the effective stator poles 88 that are produced within the individual stator teeth 50 of the stator core 28 and the stator magnets 36. Because each stator tooth 50 is divided into separate effective stator poles 88, and the subject rotor 116 includes a plurality of rotor magnet pairs 172 that include only one rotor magnet 80. Operation of the direct drive motor 10 can therefore be used to produce magnetic gearing in the form of slower rotational motion of the subject rotor 116, at a higher torque output. Stated another way, the incremental movements of the subject rotor 116 with respect to the opposing stator 112 operate with respect to the individual effective stator poles 88, rather than the number of stator teeth 50. Similarly, the operation of the subject rotor 116 is also performed with respect to the effective rotor magnet pairs 172, not the number of rotor magnets 80. These incremental movements are performed without modifying the number of windings 52 that extend around the stator teeth 50 of the stator core 28. The resulting magnetic gearing operation of each of the inner and outer rotors 14, 18 is accomplished at a lower speed, but with a significantly higher torque.

According to various aspects of the device, the windings 52 that extend around the stator teeth 50 of the stator core 28 can be positioned to produce a wide range of pole pairs 180 for the stator 22. By way of example, and not limitation, the stator 22 may include five pole pairs, six pole pairs, seven pole pairs, or other number of pole pairs 180. The configurations of the pole pair 180 can vary depending upon the particular design of the direct drive motor 10 to be used within a desired application. Using the windings 52 that extend around each stator tooth 50, the windings 52 may energize a certain number of stator poles 30 within the stator 22. Because of the positioning of the stator magnets 36, the energized stator poles 30 are able to produce double or triple the number of effective stator poles 88 based upon the configuration of the stator magnets 36.

Figure 11:
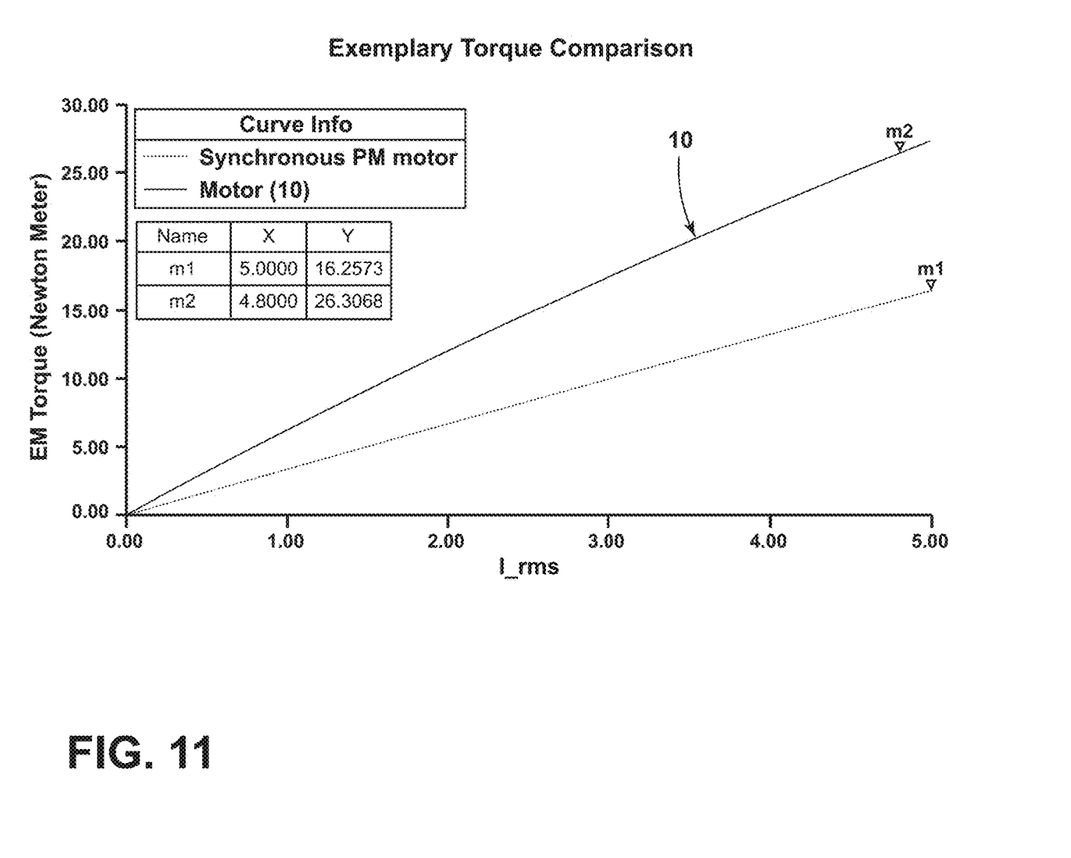
FIG. 11 is a schematic diagram illustrating an exemplary torque comparison between the direct drive motor disclosed herein and a prior art direct drive motor.
Figure 12:
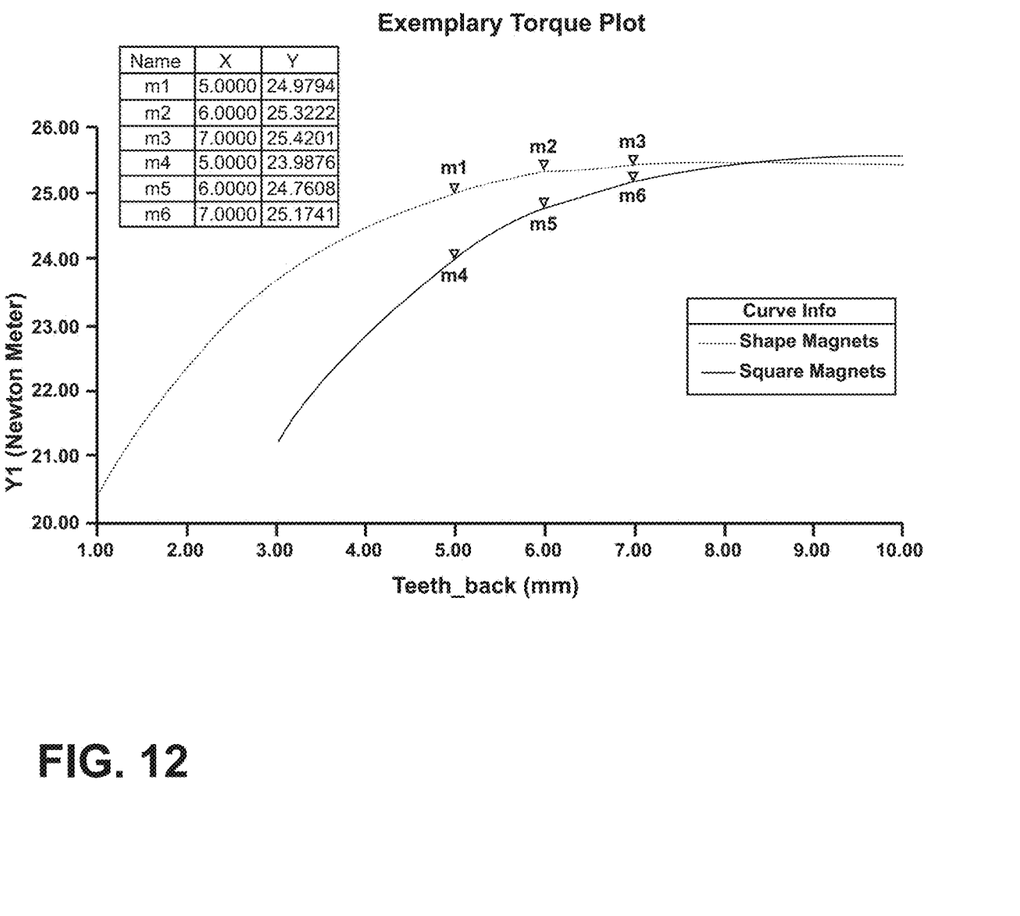
FIG. 12 is a schematic diagram illustrating the effect of exemplary variations in the shape of the stator magnets according to an aspect of the device.
Figure 13:
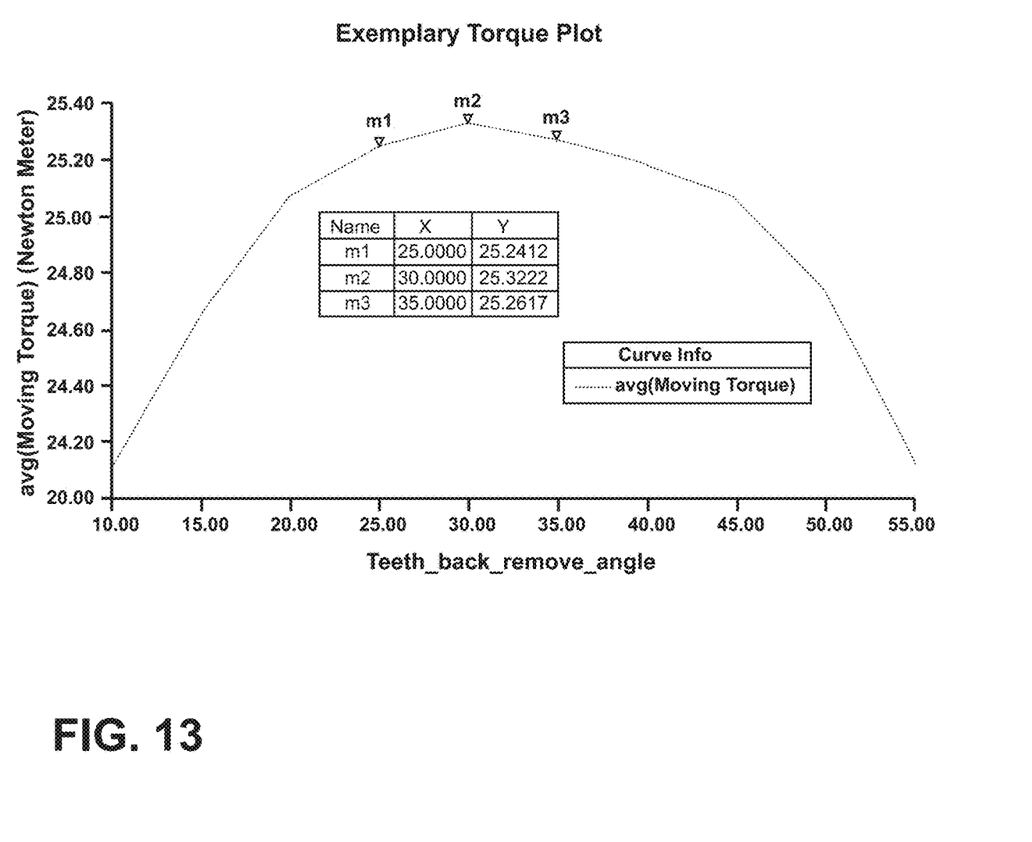
FIG. 13 is a schematic diagram illustrating the effect of exemplary variations in the shape of the teeth for the stator core of the present device.

Referring now to FIG. 11, an exemplary design of the direct drive motor 10 described herein is shown when compared with a conventional synchronous permanent magnet motor. FIG. 11 clearly shows that the exemplary direct drive motor 10 described herein provides a greater amount of torque when compared to a conventional synchronous permanent magnet motor. According to the data reflected in FIG. 11, the torque output of the exemplary direct drive motor 10 described herein is approximately double that of the conventional synchronous permanent magnet motor.

Referring now to FIGS. 9, 10, 12 and 13, the configuration of each stator tooth 50 and the stator magnets 36 has been studied to determine appropriate configurations, within particular designs. According to FIGS. 12 and 13, greater torque is achieved through the stator magnets 36 having the chamfered portions 160 that are used in combination with the angled portions 190 of the stator teeth 50. As discussed above, the combination of the angled portions 190 of the stator teeth 50 with the shaped stator magnets 36 having one or more chamfered portions 160 produces a wider flux path 38 that decreases the density of the magnetic flux 100 in the areas around the outer perimeter 40 of the stator magnet 36. Accordingly, each stator magnet 36 defines a pair of flux paths 38 that extend around the outer perimeter 40 of the stator magnet 36 and into the corresponding gap 132 that is at least partially defined by the stator magnet 36.

Figure 6:
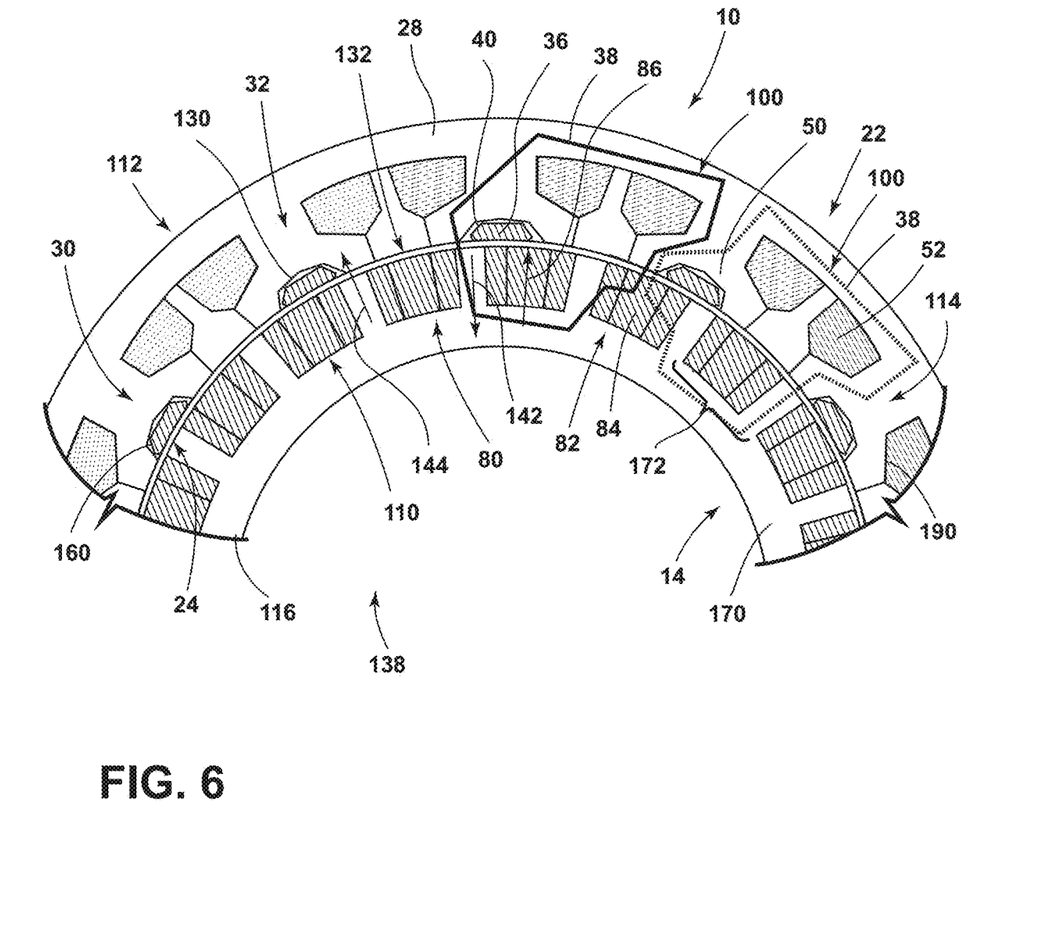
FIG. 6 is an enlarged cross-sectional view of the direct drive motor of FIG. 3 and showing flux paths when no electrical current is delivered to the windings of the stator.
Figure 7:
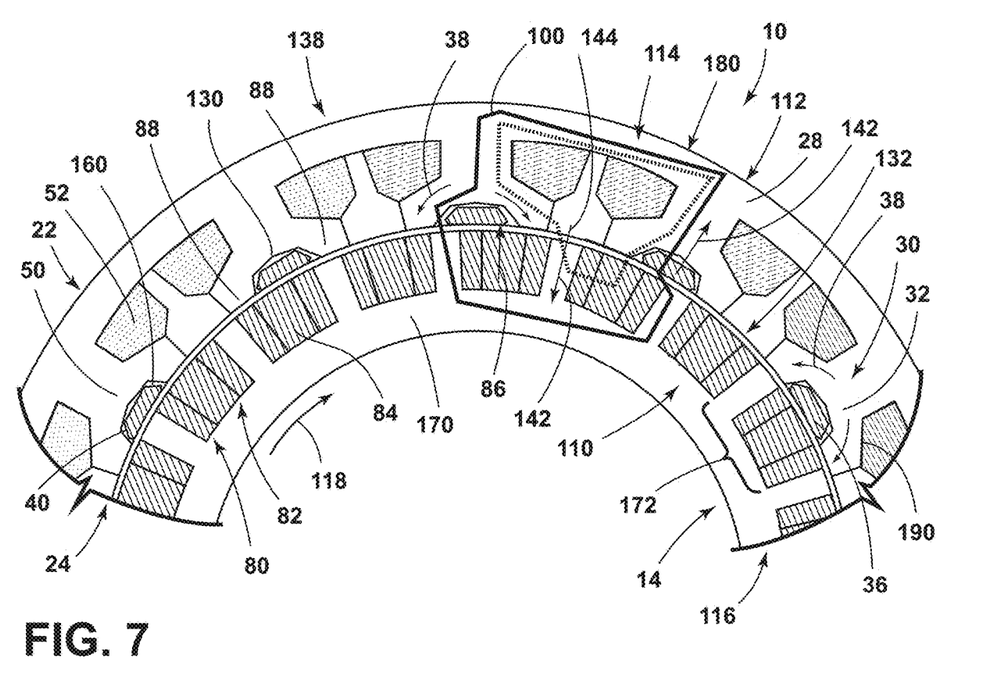
FIG. 7 is a schematic cross-sectional view of the direct drive motor of FIG. 6 showing the flux paths when electrical current is delivered to the windings of the stator.
Figure 8:
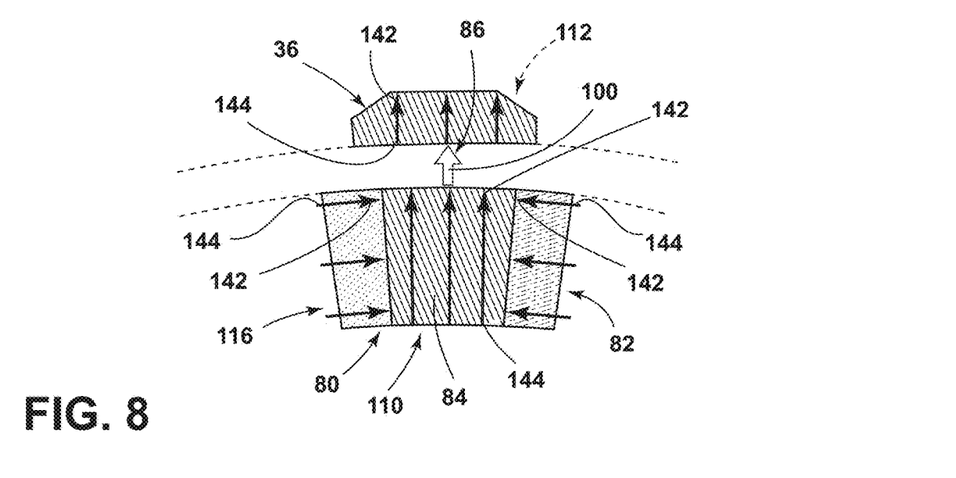
FIG. 8 is a schematic diagram illustrating the cooperation of the stator magnets and rotor magnets within the direct drive motor.

Referring now to FIGS. 6-8, the direct drive motor 10 that incorporates the stator magnet 36 and the rotor magnets 80 can produce various flux paths 38 and each of the energized and unenergized states of the windings 52 for the stator 22. In the unenergized state, the flux paths 38 are separated from one another through the magnetic interaction of the stator magnets 36 with the rotor magnets 80. When the windings 52 are energized, as exemplified in FIG. 7, the flux paths 38 at least partially overlap and the magnetic fields tend to flow through the effective stator poles 88 that are produced within opposing sides of each stator tooth 50, as well as the effective rotor magnet pairs 172.

Again, the effective stator poles 88 are separated by the stator magnets 36. Accordingly, in the unloaded condition of the permanent magnet motor, each stator tooth 50 may tend to operate as an individual stator pole 30, based upon the movement of the flux within the various flux paths 38 between the rotor magnets 80 and the stator magnets 36. When the windings 52 for the stator 22 are energized, the flux paths 38 defined between the subject rotor 116 and the opposing stator 112 tend to follow the paths of the effective stator poles 88. When the windings 52 are energized, the flux paths 38 for the magnetic flux 100 extending between the subject rotor 116 and the opposing stator 112 operates through twice as many flux paths 38 due to the positioning of the effective stator poles 88 and corresponding flux paths 38 positioned at either side of the stator magnet 36 within each stator pole 30 for the direct drive motor 10. The addition of flux paths 38 increases the electromagnetic connection between the subject rotor 116 and the opposing stator 112 as well as the torque.

Figure 9:
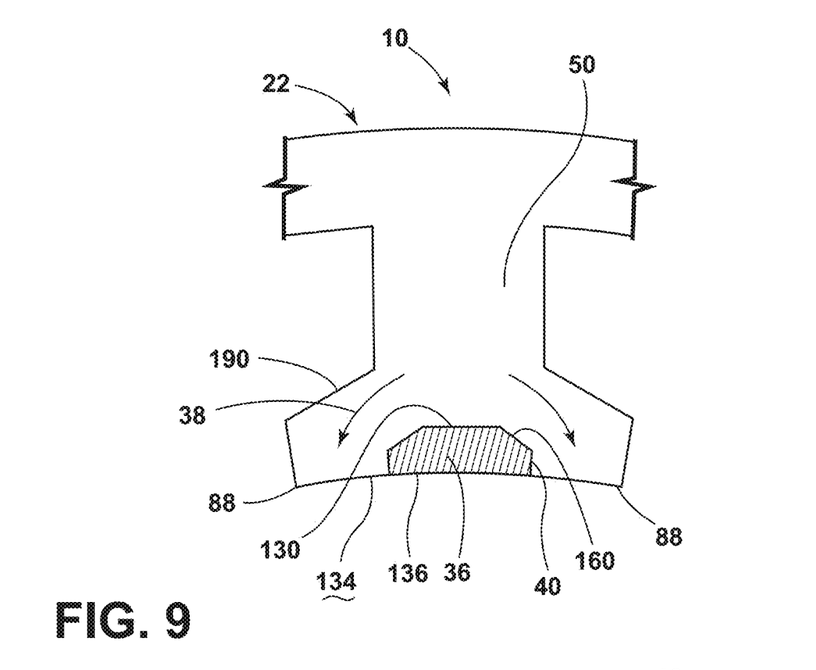
FIG. 9 is a schematic cross-sectional view of an aspect of a tooth for a stator core that incorporates an aspect of the stator magnet.
Figure 10:
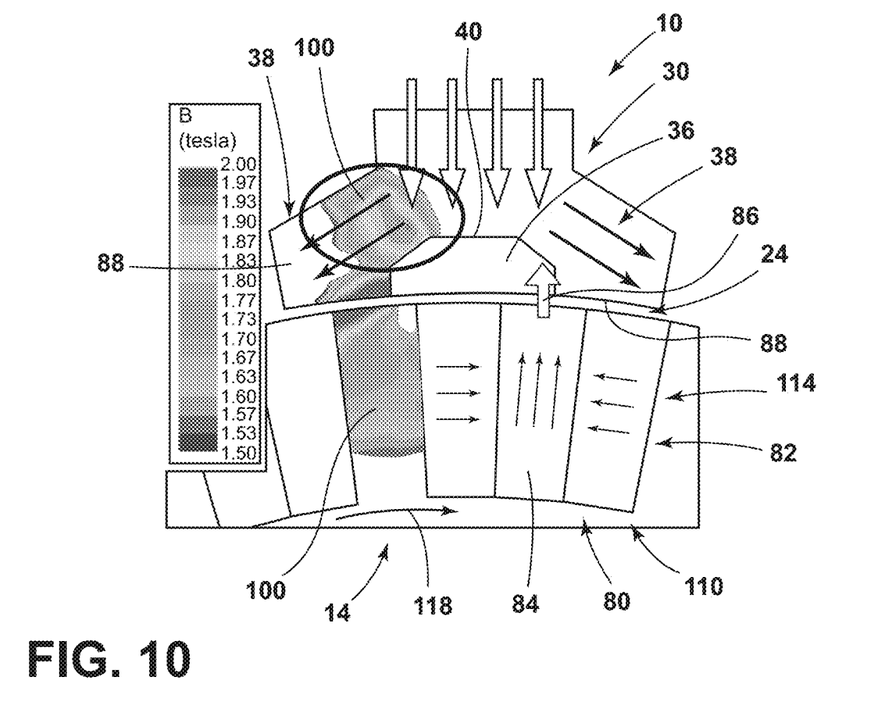
FIG. 10 is a schematic cross-sectional view of an electromagnetic interaction of the rotor and stator and the magnetic flux generated therebetween.

As exemplified in FIGS. 9 and 10, the shaping of the various stator teeth 50 and stator magnets 36 produces a larger flux path 38 through which magnetic flux 100 can travel between the subject rotor 116 and the opposing stator 112. As various windings 52 are energized and de-energized, magnetic flux 100 flows through the subject rotor 116 and the opposing stator 112 at different configurations to produce the electromotive force 118 that drives the subject rotor 116 relative to the opposing stator 112. As discussed above, each stator pole 30 for the direct drive motor 10 includes a plurality of effective stator poles 88 due to the positioning of the stator magnet 36 within the stator pole 30. It is contemplated that the number of stator magnets 36 within each stator pole 30 may operate as a gearing factor for the speed and amount of torque produced by the direct drive motor 10.

In the case of the outer-rotor configuration 140 exemplified in FIG. 4, the pair of stator magnets 36 contained within each stator pole 30 may produce a gearing effect of approximately three with respect to the outer rotor 18. Accordingly, this configuration of the stator poles 30 may produce a much slower speed, but a much greater amount of torque in operating the outer rotor 18 about the stator 22.

As discussed above, the design for the stator 22 having the stator magnets 36 that divide each stator pole 30 into a number of effective stator poles 88 and the rotor magnets 80 that cooperate with the rotor body 170 to produce rotor magnet pairs 172 can be incorporated within various configurations of the direct drive motor 10. These configurations can include, but are not limited to, inner-rotor motors, outer-rotor motors, inner and outer-rotor motors, and other similar configurations. It is also contemplated that the direct drive motor 10 disclosed herein can be used within any one of various appliances and fixtures. Such appliances and fixtures can include, but are not limited to, laundry appliances, dishwashers, refrigerators, blenders, food processors, other small appliances, various blowers, and other similar appliances and fixtures present within household and commercial settings.

According to another aspect of the present disclosure, an electric motor for an appliance includes an inner rotor coupled with a first drive shaft. An outer rotor is coupled with a second drive shaft. A stator is in electromagnetic communication with the inner and outer rotors. An inner gap is defined between the stator and the inner rotor and an outer gap is defined between the stator and the outer rotor. The stator comprises a stator core. A plurality of inner stator poles define the inner gap. A plurality of outer stator poles define the outer gap. Stator magnets are positioned within the stator core and are located to partially define at least one of the inner and outer gaps. Each stator magnet defines a pair of flux paths that extend around an outer perimeter of the stator magnet and onto a respective gap of the inner and outer gaps.

According to another aspect, each stator magnet includes a pair of chamfered portions that define the pair of flux paths. The pair of chamfered portions defines a consistent shape of the stator core at the stator magnet that decreases a density of magnetic flux around the stator magnet.

According to yet another aspect, each stator magnet includes a curved surface that defines one of the inner gap and the outer gap.

According to another aspect of the present disclosure, the stator magnets are positioned to direct a magnetic north pole away from the curved surface.

According to another aspect, each stator magnet is positioned within a magnet recess that is defined within the stator core. Each magnet recess is positioned at a gap-facing surface of the stator core.

According to yet another aspect, the stator core includes inner stator teeth that define the inner poles and outer stator teeth that define the outer stator poles.

According to another aspect of the present disclosure, the stator magnets are positioned within the inner stator teeth and each inner tooth of the inner stator teeth includes a single magnet recess that divides the inner stator pole into a pair of effective inner stator poles.

According to another aspect, the stator magnets are positioned within the outer stator teeth and each outer tooth of the outer stator teeth includes two magnet recesses that divide the outer stator pole into three effective outer stator poles.

According to yet another aspect, the inner rotor includes a plurality of rotor magnets that each define a magnet assembly that includes a plurality of magnet portions.

According to another aspect of the present disclosure, the plurality of magnet portions include three separate magnets that make up the magnet assembly, where each magnet portion of the magnet assembly is oriented in different magnet-pole orientations that direct a magnetic flux away from a rotational axis of the inner rotor.

According to another aspect, the three separate magnets include two flanking magnets that each direct a respective magnetic north pole toward a center magnet that directs the respective magnetic north pole toward a respective gap of the inner and outer gaps.

According to yet another aspect, an electric motor for an appliance includes a rotor coupled with a drive shaft. The rotor includes a plurality of rotor magnets that each define a magnet assembly including a plurality of magnet portions having different magnet pole orientations. A stator is in electromagnetic communication with the rotor. A gap is defined between the stator and the rotor. The stator comprises a stator core. A plurality of stator poles define the gap. Stator magnets are positioned within the stator core and are located to partially define the gap. Each stator magnet defines a pair of flux paths that extend around an outer perimeter of the stator magnet and into the gap. The different magnet pole orientations of the plurality of rotor magnets operate to direct an effective magnetic flux toward the gap.

According to another aspect of the present disclosure, the plurality of magnet portions includes a center magnet and two flanking magnets that each direct a respective magnetic north pole toward the center magnet that directs the respective magnetic north pole toward the gap.

According to another aspect, the rotor is an inner rotor and the stator core includes a plurality of inward extending teeth that define the plurality of stator poles.

According to yet another aspect, each stator magnet includes a pair of chamfered portions that define the pair of flux paths, and wherein the pair of chamfered portions defines a consistent shape of the stator core at the stator magnet that decreases a density of magnetic flux around the stator magnet.

According to another aspect of the present disclosure, each stator magnet includes a curved surface that defines the gap, and wherein the stator magnets are positioned to direct a magnetic north pole away from the curved surface. Each stator magnet is positioned within a magnet recess that is defined within the stator core. Each magnet recess is positioned at a gap-facing surface of the stator core.

According to another aspect, the stator core includes inner stator teeth that define inner stator poles and outer stator teeth that define outer stator poles. The stator magnets are positioned within the inner stator teeth and each inner tooth of the inner stator teeth includes only one magnet recess that divides the inner stator pole into a pair of effective inner stator poles.

According to yet another aspect, the stator magnets are positioned within the outer stator teeth and each outer tooth of the outer stator teeth includes two magnet recesses that divide the outer stator pole into three effective outer stator poles.

According to another aspect of the present disclosure, an electric motor for an appliance includes a rotor coupled with a drive shaft. The rotor includes magnet assemblies. Each magnet assembly includes a plurality of magnet portions having different magnet pole orientations. A stator is positioned in electromagnetic communication with the rotor. A gap is defined between the stator and the rotor. The stator includes a stator core. A plurality of stator poles extend inward toward the rotor to define the gap. Stator magnets are positioned within the stator core to at least partially define the gap. The plurality of magnet portions of each magnet assembly defines a Halbach configuration that directs an electromagnetic field toward the gap and directs an effective magnetic north pole of the magnet assembly toward the gap to increase an electromagnetic communication between the rotor and the stator.

According to another aspect, each stator magnet defines a pair of flux paths that extend around an outer perimeter of the stator magnet and onto the gap. The different magnet pole orientations operate to direct a magnetic flux toward the gap.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A stator for an electric motor, the stator comprising:
   a stator core;
   a plurality of inner stator poles having inner windings and a plurality of inner stator teeth, wherein each tooth of the plurality of inner stator teeth includes angled portions;
   a plurality of outer stator poles having outer windings and a plurality of outer stator teeth; and
   stator magnets that are positioned within gap-facing surfaces of each tooth of the plurality of inner stator teeth, wherein each stator magnet includes chamfered portions that cooperates with the angled portions of each respective tooth to define a pair of flux paths having a consistent shape and thickness that decreases a density of magnetic flux around the stator magnets, and wherein each pair of flux paths extend around an outer perimeter of the respective stator magnets and through a gap-facing surface of the respective tooth.

2. The stator of claim 1, wherein the inner windings extend around the plurality of inner stator teeth and the outer windings extend around the plurality of outer stator teeth, wherein the stator magnets are positioned at least within the gap-facing surface of the plurality of inner stator teeth.

3. The stator of claim 1, wherein the chamfered portions of each of the stator magnets includes a pair of chamfered portions that define the pair of flux paths, and wherein the pair of chamfered portions defines the consistent shape of the stator core at the stator magnet.

4. The stator of claim 1, wherein each of the stator magnets includes a curved surface that matches a curvature of the gap-facing surface of the plurality of inner stator poles.

5. The stator of claim 4, wherein the stator magnets are positioned to direct a magnetic north pole away from the gap-facing surface.

6. The stator of claim 1, wherein a portion of the stator magnets are positioned within a magnet recess that is defined within the inner stator teeth, wherein each magnet recess is positioned at the gap-facing surface.

7. The stator of claim 1, wherein the stator core includes the inner stator teeth that define the inner stator poles and the outer stator teeth that define the outer stator poles.

8. The stator of claim 7, wherein the stator magnets are positioned within the inner stator teeth and each inner tooth of the inner stator teeth includes a single magnet recess that divides the inner stator poles into pairs of the effective inner stator poles.

9. The stator of claim 8, wherein the stator magnets are positioned within the outer stator teeth and each outer tooth of the outer stator teeth includes two magnet recesses that divide each of the outer stator poles into three effective outer stator poles.

10. An electric motor for an appliance, the electric motor comprising:
 a rotor coupled with a drive shaft; and
 a stator in electromagnetic communication with the rotor, wherein a gap is defined between the stator and the rotor, the stator comprising:
  a stator core having a plurality of stator poles that define the gap, wherein each stator pole of the plurality of stator poles includes opposing angled portions; and
  stator magnets that are positioned within the stator core and are located at a gap-facing surface of the plurality of stator poles to partially define the gap, wherein each of the stator magnets includes a pair of chamfered portions that cooperate with the respective pair of chamfered portions to define a pair of flux paths that extend around an outer perimeter of the stator magnets and into the gap, the pair of flux paths having a consistent shape of the stator core at the stator magnet that decreases a density of magnetic flux around the stator magnet.

11. The electric motor of claim 10, wherein the rotor includes a plurality of rotor magnets that each define a magnet assembly including a plurality of magnet portions having different magnet pole orientations.

12. The electric motor of claim 11, wherein the different magnet pole orientations of the plurality of rotor magnets operate to direct an effective magnetic flux toward the gap.

13. The electric motor of claim 11, wherein the plurality of magnet portions includes a center magnet and two flanking magnets that each direct a respective magnetic north pole toward the center magnet that directs the respective magnetic north pole toward the gap.

14. The electric motor of claim 10, wherein the rotor is an inner rotor and the stator core includes a plurality of inward extending teeth that define the plurality of stator poles.

15. The electric motor of claim 10, wherein each of the stator magnets includes a curved surface that defines the gap, and wherein the stator magnets are positioned to direct a magnetic north pole away from the curved surface.

16. The electric motor of claim 15, wherein each of the stator magnets is positioned within a magnet recess that is defined within the stator core, wherein each magnet recess is positioned at the gap-facing surface of the stator core.

17. The electric motor of claim 10, wherein the stator core includes inner stator teeth that define inner stator poles and outer stator teeth that define outer stator poles, and wherein the stator magnets are positioned within the inner stator teeth and each inner tooth of the inner stator teeth includes only one magnet recess that divides the inner stator poles into pairs of effective inner stator poles that are defined by the consistent shape of the stator core at the stator magnet.

18. The electric motor of claim 17, wherein the stator magnets are positioned within the outer stator teeth and each outer tooth of the outer stator teeth includes two magnet recesses that divide each of the outer stator poles into three effective outer stator poles.

19. An electric motor for an appliance, the electric motor comprising:
 a stator positioned in electromagnetic communication with a rotor, wherein a gap is defined between the stator and the rotor, the stator comprising:
 a stator core;
 a plurality of stator poles that extend inward toward the rotor to define the gap; and
 stator magnets that are positioned within the stator core at a gap-facing surface of the plurality of stator poles to at least partially define the gap, wherein
 the stator core and the stator magnets cooperate to define a curvature of the gap-facing surface that is concentric with a rotational axis of the rotor, and wherein the stator core and the stator magnets further cooperate to define matching chamfered portions that form a pair of flux paths that decrease a density of magnetic flux around the stator magnets.

20. The electric motor of claim 19, wherein the pair of flux paths include a consistent shape and thickness within each respective stator pole of the plurality of stator poles.

* * * * *